Figure 1:
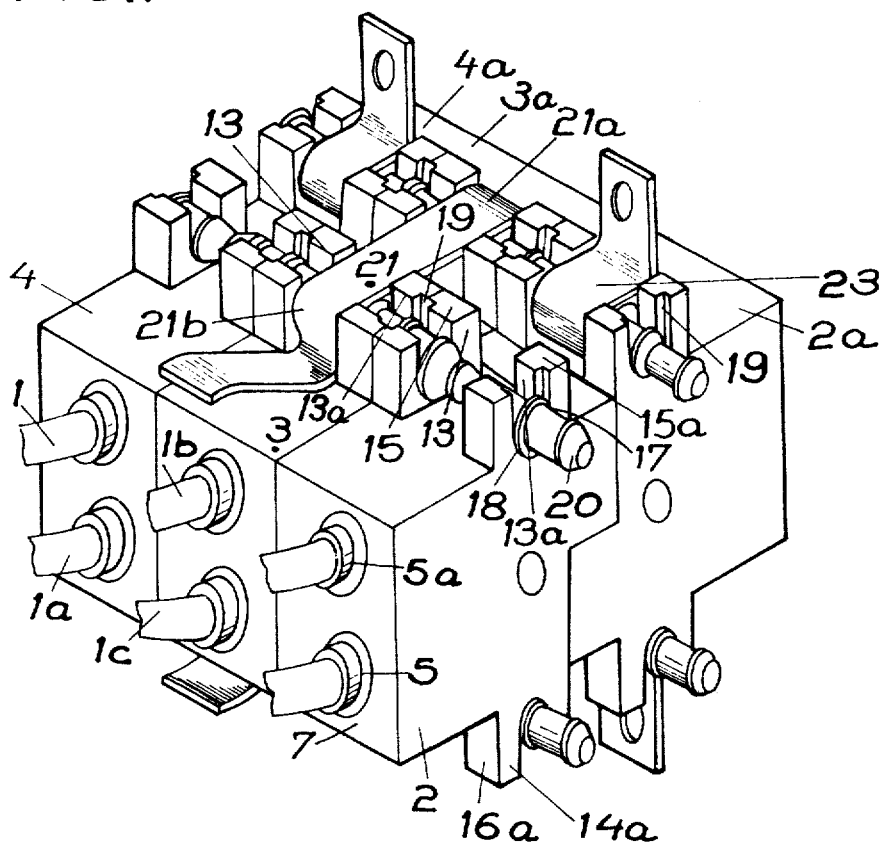

United States Patent [19]
Delessert

[11] 3,888,518
[45] June 10, 1975

[54] FLUID CONDUIT CONNECTING DEVICE

[75] Inventor: Marcel Delessert, Alens-sur-Cossonay, Switzerland

[73] Assignee: Societe Corobit Anstalt, Treuunternehmen, Lichtenstein

[22] Filed: Jan. 21, 1972

[21] Appl. No.: 219,802

[30] Foreign Application Priority Data
Jan. 21, 1971 France .................. 71.02004

[52] U.S. Cl. .................. 285/39; 137/271; 285/61; 285/70; 285/93; 285/137 R
[51] Int. Cl. ............................. F16l 39/00
[58] Field of Search...... 285/137 R, 137 A, 65, 305, 285/39, 70, 71, 72, 73, 79, 131, 61; 137/271, 608; 251/367

[56] References Cited
UNITED STATES PATENTS

| 2,033,348 | 3/1936  | Miller     | 285/70 X   |
|-----------|---------|------------|------------|
| 2,834,368 | 5/1958  | Gray       | 137/271    |
| 3,194,257 | 7/1965  | Stephens   | 251/367 X  |
| 3,406,371 | 10/1968 | Buckeridge | 285/61 X   |
| 3,516,442 | 6/1970  | Munroe     | 251/367 X  |
| 3,589,387 | 6/1971  | Raymond    | 137/271    |
| 3,707,989 | 1/1973  | Jullien-Davin | 137/271 X |

Primary Examiner—Thomas F. Callaghan
Attorney, Agent, or Firm—Fitzpatrick, Cella, Harper & Scinto

[57] ABSTRACT

This invention provides a multi-way adaptor device for fluid conduits, particularly pneumatic conduits. Elements to be coupled together are arranged in pairs and all these elements are substantially identical. Each element carries orifices on one face thereof and these orifices are provided with attachment means to couple them to the ends of the appropriate conduits. The opposite face of each element is provided with a male member and a female member adapted to cooperate respectively with a female and a male member of another identical element to form a pair. The elements themselves also have inner link conduits discharging on one side towards the aforementioned orifices for linking the conduits by the attachment means and on the other side towards the orifices provided on the male and female members. The interengagement can be effected by locking lugs releasable by means of a fork member.

5 Claims, 14 Drawing Figures

PATENTED JUN 10 1975 3,888,518

SHEET 1

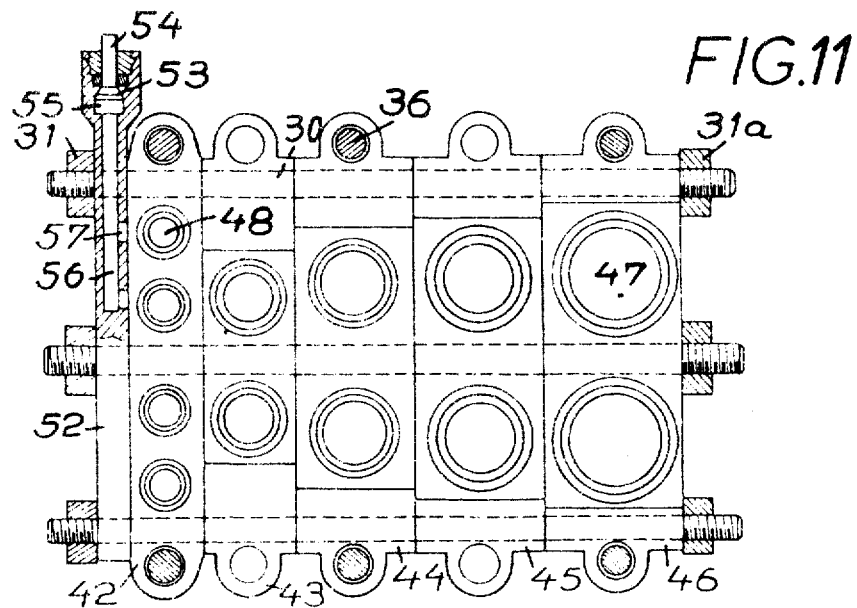
FIG. 11
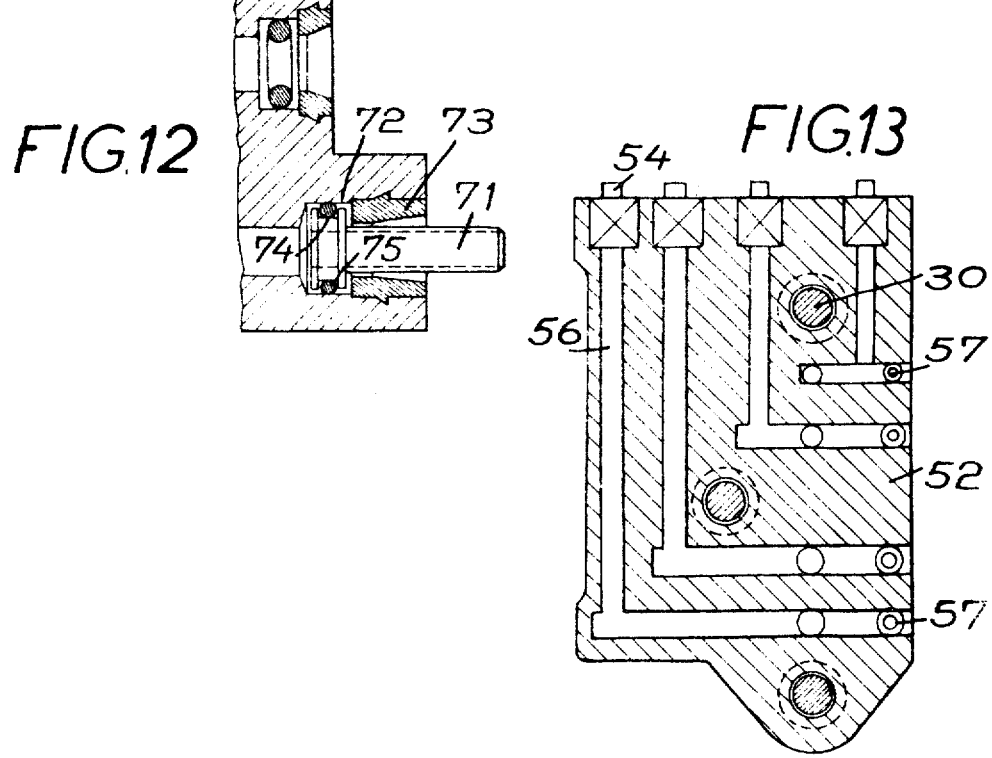
FIG. 12
FIG. 13

FLUID CONDUIT CONNECTING DEVICE

The present invention relates to a multiple connecting device for fluid conduits.

In order to ensure connection between different electrical conductors, it is known to use multiple electrically connectable connectors which are formed either of juxtaposed elements held by different assembly means or by an assembly made in one piece.

Moreover, it is present day practice to use in installations using fluids, multiple connection means for fluid conduits which are very similar to those used in the electrical art.

Known multiple connecting devices for fluids and more particularly for pneumatic installations do not have characteristics enabling standardisation as satisfactory as for the devices used in the electrical industry.

The invention has for an object a multiple connecting device for fluid conduits which enables the user to make up very easily, different joints between several conduits or pipes of different diameters.

It is a further object that said device shall enable the connection and rapid disconnection of connectors with a minimum of effort by the user. A further object is to make it possible to use as required different diameters of piping on the same connection.

According to the invention, a multiple connecting device as used for fluid conduits, comprises a juxtaposition of a plurality of pairs of coupled elements, wherein all the elements are substantially identical and have on one of their faces orifices provided with means for joining with the ends of the conduits and on the opposite face a male member and a female member capable of nesting respectively in a female member and a male member of another identical element, so as to form a pair of elements which are interconnected by coupling members, the said elements having inner link conduits discharging on one side towards the link orifice of the conduits and on the other side towards the orifices provided on the male and female members.

The elements comprise both male and female members, and this enables the use of a single standard element which ensures simplification in manufacture and storage.

Moreover, the use of lugs of a single type enables the coupling of the elements to be easily effected, and assembly by juxtaposing the pairs of elements.

Moreover, the design of the elements renders the inversion of the connections impossible by reason of the assymmetry of the elements.

Figure 2:
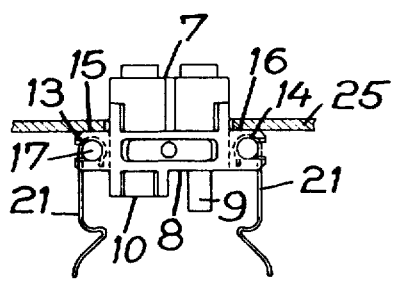
Figure 3:
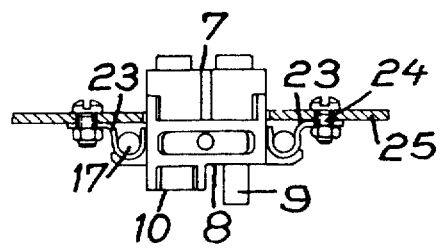
Figure 5:
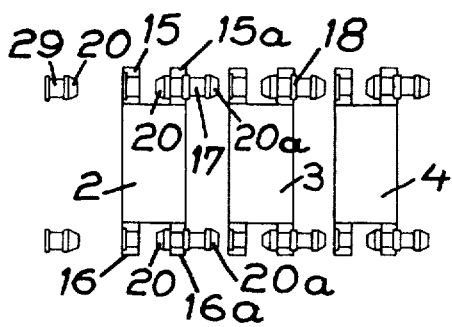
Figure 4:
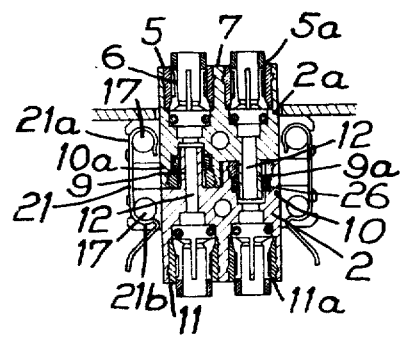
Figure 7A:
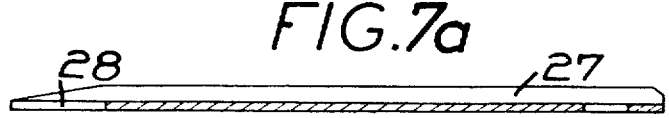
Figure 7B:
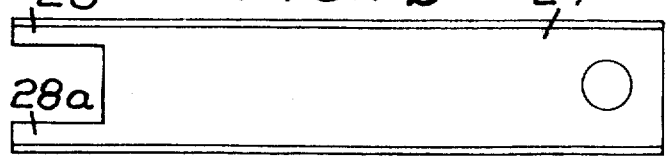
Figure 6:
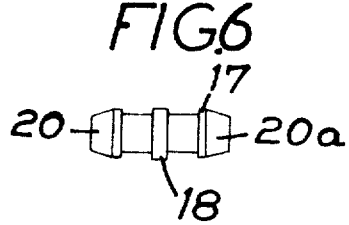
Figure 8:
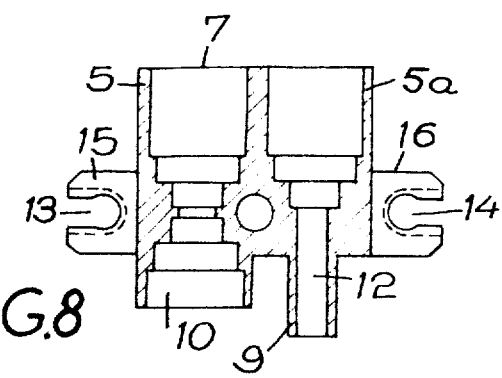
Figure 9:
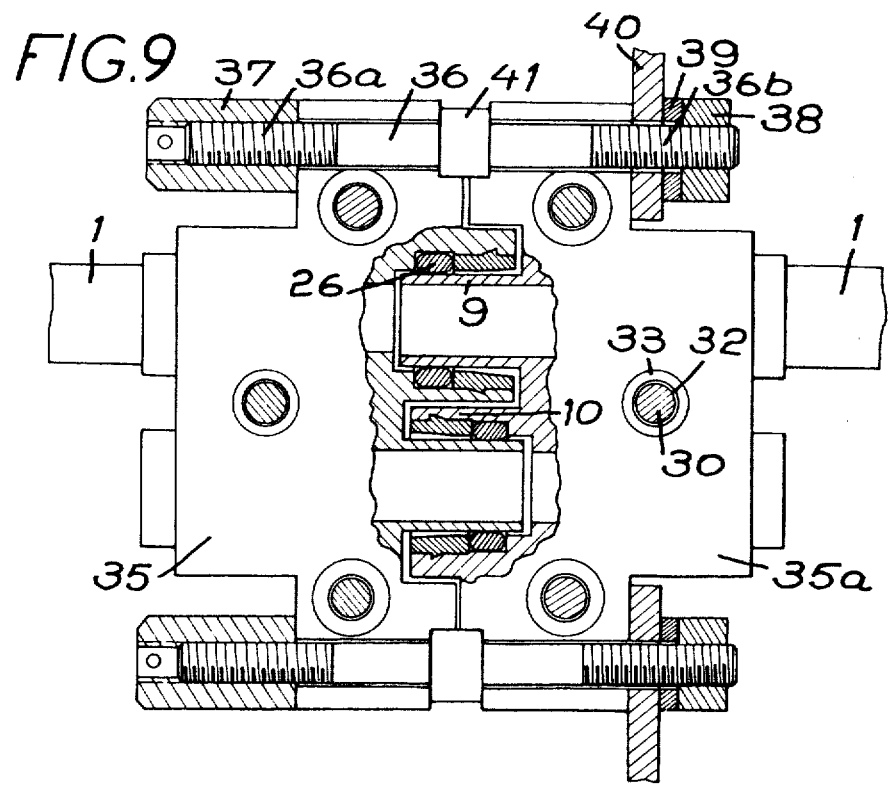
Figure 10:
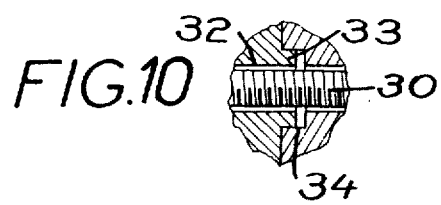

Other characteristics and advantages of the invention will be better understood by reading the description which follows of several embodiments given purely by way of example with reference to the accompanying drawings, in which:

FIG. 1 is a perspective view of one embodiment of a multiple connecting device for fluid conduits according to the invention, FIGS. 2 and 3 show views of a multiple connecting element mounted on a plate, and a free element, FIG. 4 is a longitudinal section of a pair of linked elements, FIG. 5 shows an assembly of a plurality of pairs of juxtaposed elements, FIG. 6 is a view of an assembly lug, FIGS. 7a and 7b are views in section and in plan of a fork for ejecting the lugs, FIG. 8 is a view in section of a connecting element to a large scale, FIG. 9 is a view, partly in section, of two elements coupled by means of coarse-pitch screws, FIG. 10 is a view of a detail showing the members for centering the elements, FIG. 11 is an elevation of an assembly of juxtaposed elements for conduits of different diameters, FIG. 12 is a sectional view of an element provided with a detachable male member, and FIG. 13 is a longitudinal section of a pressure indicator spacer.

Referring now to the drawings, FIG. 1 shows a multiple connection device for conduits 1, 1a, 1b, 1c, intended to convey any fluid, more particularly compressed air. In FIG. 1 only those conduits have been shown which are situated on the front face but it will be apparent that corresponding conduits exist on the rear face.

The multiple connection device comprises a juxtaposition of a plurality of coupled pairs of elements 2, 2a; 3, 3a; and 4, 4a which are identical. Each element 2 to 4 is of parallelepipedal shape and has on one of its faces 7 orifices 5, 5a (FIGS. 4 and 8) provided with means for attachment to the ends of the conduit 1, which means are made more particularly from plastics material. The attaching means may be formed by instantaneous links of the type comprising a holder 6, as shown in FIG. 4, couplings having a grooved socket, crimping couplings and other arrangements which may be adapted to suit.

On the other face 8, opposite the face 7, situated on the connecting side of the pipes, each element such as 2 (FIGS. 2, 3, 4 and 8) comprises a male member 9 and a female member 10 which are capable of nesting respectively in a female member 10a and a male member 9a of another identical element 2a so as to form a pair of elements 2, 2a, 3, 3a and 4, 4a (FIG. 1).

In order to ensure communication between the conduits as connected to the orifices 5, 5a of the element 2a and to the orifices 11, 11a of the element 2, the elements have inner link conduits discharging on one side towards the orifices 5, 5a and 11, 11a and on the other side towards the orifices provided on the male and female members. In the bore of each female member is arranged a resilient sealing 0-ring 26.

The members 2 to 4 each comprise a male member 9 and a female member 10, they are identical whereby only one type of element has to be manufactured.

In order to ensure assembly of the juxtaposed elements, their coupling and their attachment on a support, the elements 2 to 4 have, on two opposite faces, two slots 13, 13a and 14, 14a which are provided in lugs 15, 15a and 16, 16a (FIGS. 1, 2, 3 and 8) cast or moulded with the body of the element. The slots 13, 13a and 14, 14a are defined by resiliently deformable walls and are capable of receiving along two perpendicular directions, lugs 17 (FIGS. 1, 2, 3, 4 and 6) which are engaged in corresponding slots 13, 13a and 14, 14a of another juxtaposed element and of thus obtaining assemblies of a plurality of juxtaposed elements as shown on FIGS. 1 and 5.

The lugs 17 (FIGS. 4, 5 and 6), which are symmetrical, have a centering flange 18 engaged in corresponding recesses 19 provided in the lugs 15, 15a and 16, 16a, the said lugs also have two bosses 20, 20a which form, for two juxtaposed lugs, an axis of rotation on which is hinged one of the ends of a fastener 21, the other end 21b of which is hooked onto the bosses 20, 20a of lugs 17 mounted, for example, on an element unit 22 to be coupled. This axis of rotation formed by the bosses 20, 20a of two juxtaposed lugs 17 may also receive a fixing foot 23 in which is mounted a pin 24 for the attachment on a support plate 25 of a multiple connecting unit.

For removal of the lug 17, a fork 27 (FIGS. 7a, 7b) can be used which has two limbs 28, 28a capable of being engaged under the bosses 20, 20a of a lug 17 and bearing against the wall of the element so as to raise the said lug more easily and to release it from the slots 13, 13a or 14, 14a in which it is engaged. The lugs 29 arranged at the end of an assembly of elements (FIG. 5) have only a single fastening boss 20.

In the case of fluid under great pressure, another method of assembling the juxtaposed elements is used as shown in FIGS. 9 and 11 in which a plurality of threaded rods 30 are engaged in holes 32 of the elements and provided at their ends with nuts 31, 31a.

In order to facilitate relative positioning of the elements, bosses 33 (FIG. 10) are provided about the hole 32, said bosses being engaged in corresponding recesses 34, provided on the juxtaposed element.

For coupling two elements 35, 35a subjected to great stresses, coarse-pitch screws 36 are used of which one threaded end 36b is engaged in a nut 38 which also ensures the attachment, with interposition of a washer 39, to a support plate 40. The screw 36, particularly the central part thereof, has a square 41 preventing it from turning.

In the embodiment shown in FIG. 11, the elements 42 to 46 have orifices 47 which enable conduits of different diameters to be assembled. Each element may comprise a number of orifices in multiples of two, for example as shown, the element 42, which has four orifices 48. The thickness of the elements 42 to 46 is different, but the surface dimensions are identical to enable juxtaposition and centering thereof.

According to another feature of the invention, the device may comprise pressure-indicating spacers 52 (FIGS. 11, 13) which are juxtaposed more particularly with the multiple connection elements 42 to 46. These spacers 52, which have holes 32 for the passage of threaded rods 30, are of identical shape to the elements in order to ensure their juxtaposition. The upper part of the spacers 52 have pressure-indicating members formed by pistons 53 having bosses 54 which project when the fluid and the pressure acts on the pistons 53. The pistons 53 move in a chamber 55 which is connected by pass conduits 56 to the inner conduits 12 of the different elements and the orifices 57 of which discharge in the inner conduits.

Moreover, the elements such as 42 have pass conduits which are normally shut off by a fine sheet of material or a ball capable of being removed for the use of the pressure connection.

In the embodiment of the elements shown on FIGS. 1 to 15, male and female elements are used which are moulded with the body; however, it is also possible to use male and female members added to the body as shown on FIG. 12. This arrangement enables a certain possibility of orientation to be imparted to the male member facilitating coupling and, in addition, large tolerances in manufacture.

According to one embodiment shown on FIG. 12, the male ferrule 71 is held in a recess 72 by an anchored ring 73, the said ferrule having a throat 74 in which is arranged an 0-ring 75. Finally, although it has not been shown in the drawing, the orifices of the elements may be shut off by means of stoppers which are detachable for the protection of the piping against dust in the case of disconnection. This arrangement will be apparent to those skilled in the art and a showing thereof is thus unnecessary.

It will be apparent that various modifications may be made by the man skilled in the art to the devices or methods shown and described solely by way of non-limiting examples, without departing from the scope of the invention as defined by the appended claims.

I claim:

1. Multiple connection device for fluid conduits comprising a juxtaposition of a plurality of pairs of coupled elements, wherein all said elements are substantially identical and each one is formed with orifices on one of its faces and with means for attachment to the ends of said conduits to effect fluid communication between said conduits and respective of said orifices, and the opposite face of each element is provided with a bored male member and a bored female member capable of nesting respectively in a female member and a male member of another identical element so as to form a pair of elements which are interconnected by coupling members, the said element having inner passageways each communicating on one side with one of said orifices and on the other side with a bore in one of said members, each element being provided with means forming slots on two opposite faces with at least two slots situated close to the juxtaposed faces of said elements, the means forming said slots being resiliently deformable whereby said slots receive symmetrical lugs formed with recessed portions adapted to engage opposed surfaces of the means forming said slots to ensure assembly of said pairs of juxtaposed elements, at least two of said lugs forming an axis of rotation on which a fastener is engaged for coupling two of said elements.

2. Multiple connection device according to claim 1, wherein fixing means are mounted on said axis of rotation formed by said two juxtaposed lugs, for attachment to a support.

3. Multiple connection device according to claim 1, wherein said lugs comprise centering flanges which are engageable in corresponding recesses provided on said element.

4. Multiple connection device according to claim 1, wherein said lugs arranged at the end of an assembly of said elements, comprise a single hooking boss.

5. Multiple connection device according to claim 4, wherein said lugs have bosses for being removed from said slots in which they are engaged, by means of a fork having two limbs pressable against said lug under said bosses.

* * * * *